UNITED STATES PATENT OFFICE.

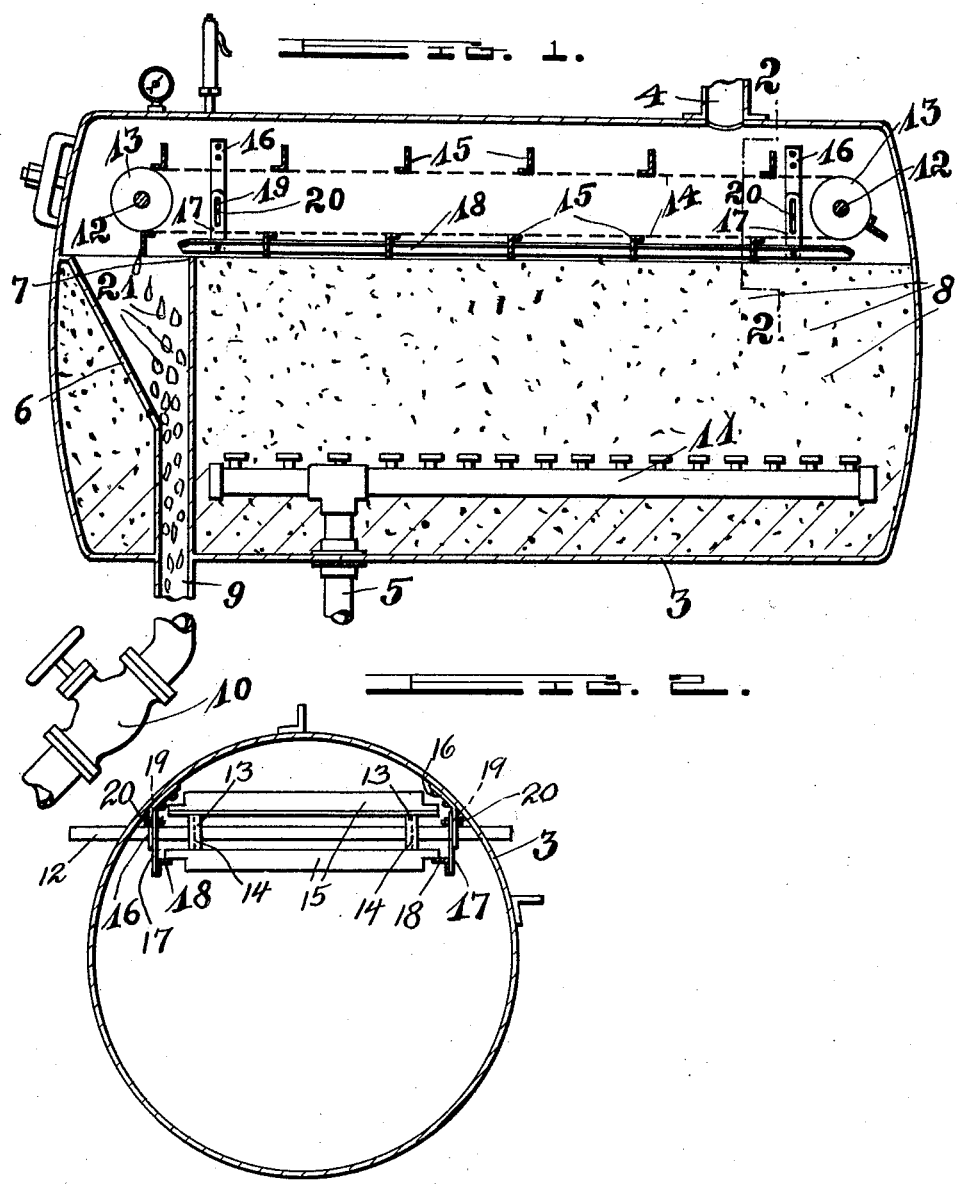

CHARLES W. SIRCH, OF LOS ANGELES, CALIFORNIA.

VACUUM-CLEANED FILTER.

1,408,228.   Specification of Letters Patent.   Patented Feb. 28, 1922.

Application filed May 2, 1919. Serial No. 294,242.

*To all whom it may concern:*

Be it known that I, CHARLES W. SIRCH, a citizen of the United States, residing at Los Angeles, in the county of Los Angeles and State of California, have invented a new and useful Vacuum-Cleaned Filter, of which the following is a specification.

This invention relates to devices for filtering industrial and other water by retaining and separately discharging the sediments, sludge, slush, or similarly solid matter; while normally discharging the clean and filtered water in a continuous stream.

One of the objects of this invention is to remove any solids and sediments from the surface of the filtering medium during the operation of the device.

Another object is to prevent the depositing of foul sediment and similar matter in the pockets in the surface of the filtering medium.

Another object is to provide means for removing such undesired deposits from the surface of the filtering medium without interrupting the action of the filter.

Another object is to provide means for accumulating such removed deposits away from the filtering medium for a proper time to be removed from the device.

Another object is to provide means for discharging such removed deposits preferably by gravity instead of by back-washing.

Another object is to produce by such removing or discharging of the deposits a vacuum suitable for drawing sediment from out of the pockets in the mass of filtering medium.

Another object is to reduce the use of clean filtered water otherwise used for back-washing.

Another object is to eliminate to the possibly highest degree the violently agitating of the filtering medium during the process of back-washing.

Another object is to reduce the loss of filtering medium under operation and during the process of back-washing.

Other objects will appear from the following description and appended claims as well as from the accompanying drawing, in which—

Fig. 1 is a longitudinal sectional view of the device.

Fig. 2 is a cross section on line 2—2 of Fig. 1, of the adjusting and supporting means for the sediment removing means, illustrated within the casing of the device to show the relative location.

In Fig. 1, 3 designates the casing, 4 the inlet connecting end, and 5 the outlet connecting end. Within the casing 3, near one end, I prefer to arrange a hopper-shaped receptacle 6 with its upper edge 7 at a point normally constituting the line along which the top surface of the filtering medium in this device is maintained, that is to say that filtering medium, designated at 8, is disposed in the device up to a height level with the top edge 7 of the receptacle. Slight deviation between the top edges of the receptacle and the surface of the medium, of course, does not materially influence the operation of the device, as will easily be understood from the description hereafter. The receptacle communicates with a discharge connecting end 9, which in turn is provided with a shut-off valve 10.

A strainer-header is connected to the inner termination of the outlet connecting end 5 as indicated at 11. This header naturally compels the water to practically pass through the whole of the filtering medium during the normal operation of filtering as well as during the process of back-washing for the purpose of cleaning the filtering medium, as will easily be understood.

Above the filtering medium there is a mechanism arranged for various purposes, among others, for preventing solids from accumulating on the top surface of the filtering medium which would naturally cause a clogging up of the passages through the filtering medium thereby reducing the efficiency of the device; for allowing a removing of the sediments from the top surface of the filtering medium during the operation of the device; for leveling the top surface of the filtering medium after back-washing thereby keeping the surface of the medium free of holes after the daily back-washing; and for moving the sediments and solids to a place within the device from which such waste may be discharged at a suitable moment. This mechanism consists mainly of shafts 12, one of which to be extended to the outside to allow an operation from the outside; pulleys, drums, sprocket wheels, or similar means 13 for supporting and moving the other means; and flexible members 14, carrying the rakes or blades 15. The flexible members can be of a steel band, sprocket-chain, cable or other similar material, as long as they allow a moving by the drums, sprockets, or wheels 13. The blades or rakes 15 are naturally disposed crosswise to the flexible members so as to rake or strike over the surface of the filtering medium when moved by the shafts 12. If one of the shafts is extended through the casing 3, a raking or striking over the surface by this mechanism can naturally easily be accomplished while the device is in operation for the purpose of filtering water, as will easily be understood.

To allow an adjusting of the striking so as to cause the blades or cross members to touch more or less when passing over the surface of the filtering medium, adjusting means are provided. Straps 16 are secured to the inside of the casing. Other straps 17 are secured to a suitable long-frame 18. The frame 18 is so disposed that the cross members 15 may slidingly pass over it from one end of the device to the other end of the device. The straps 17, or the opposite straps, are provided with slots 19. Bolts 20 disposed through the straps 16 and 17 naturally allow a clamping contact so as to make an adjusted holding of the frame 18 possible. Having adjusted the frame 18 by means of the slots and bolts in the straps 16 and 17 to bring and hold the frame in a certain position above the top surface of the filtering medium in the device, this naturally guides the cross members 15 over the surface of the filtering medium 8 in a sliding and touching contact with the filtering medium or a suitable distance spaced above the medium, as will easily be understood. In such a passing position over the medium 8, the cross members naturally are disposed to strike off any matter that has not originally been there, as solids, sediment and similar matter accumulating so during the filtering process. Operating the cross members 15 to strike off all such matter naturally brings this into the receptacle 6 as indicated at 21 without interrupting the action of the device. Here in the receptacle all this matter remains until for a proper time to discharge it through the valve 10. Generally and normally such discharging is and can be done any time during the filtering process, since the opening of the valve naturally only allows the accumulated matter to discharge first, and, as soon as clean fluid appears at the discharge, the valve is turned off at any desired moment. With these arrangements little clean fluid is lost by cleaning and in keeping clean this device.

For a thorough cleaning of the device, and more particularly for a thorough cleaning of the filtering medium, the filtering action is naturally stopped first, then the valve 10 is opened, which allows the waste at 21 to discharge through the connecting end 9. Such discharging, under normal condition, causes a suitable vacuum through the device, which is especially of advantage in drawing sediment from out of the pockets in the filtering medium, such action being increased by the opening of a valve disposed at a suitable point in the outlet pipe line 5 without admitting water, so that air is sucked through the filtering medium; this scrubs the minute grains of quartz and cleanses the filter. A valve is not shown in the drawing, and only a short connecting end of the outlet pipe 5 is illustrated in Fig. 1, it will however easily be understood how such a valve is to be used under normal conditions; and the above will be clear without further illustration of such common and well known details, as valves, pipes, etc. Part of the air becomes trapped in the strainer system and in the filter and is later forced up by the water backwash, thus agitating the filter bed under considerable pressure without disarranging the filtering medium. By these means, the water used for backwashing is reduced to merely a small percentage of the quantity required by other filters, and, as filtered water must be used for the backwashing, a considerable saving is made.

Vacuum, of course, can only be produced in closed devices, which are usually operated under pressure, but it will easily be understood that the principle of raking off the sediments into an extra receptacle can just as easily be used in devices with the top open, the waste matter simply dropping at one end into such receptacle.

Having thus described my invention, I claim:

1. In a filter, an airtight casing, a receptacle and a filter bed within the casing, shifting mechanism disposed above the filter bed for shifting waste matter normally accumulating on the surface of the filter bed into the receptacle, and controlling means on the receptacle for holding and discharging the waste matter in the receptacle, the receptacle having such size as to cause vacuum in the filter bed when the waste is discharged from the receptacle.

2. In a filter, an airtight casing, a receptacle and a filter bed within the casing, the receptacle having an open upper end and with its upper edge located and disposed at a point near the top of the filter bed so as to produce vacuum above the filter bed when the receptacle is drained for cleaning the filter bed.

3. In a filter, an airtight casing, a receptacle and a filter bed within the casing, the receptacle having an open upper end and having its upper edge located at a point near the top of the filter bed, the receptacle being of such a size as to produce a vacuum in the filter bed when the receptacle is being drained for cleaning the filter bed.

In testimony that I claim the foregoing as my invention I have signed my name in the presence of two subscribing witnesses.

CHARLES W. SIRCH.

Witnesses:
 LAURA POPE,
 LILLIAN P. ODERNAD.